Inventors
HERBERT J. KLINE
and ARTHUR D. KNAPP
By Beaman & Langford
Attorneys

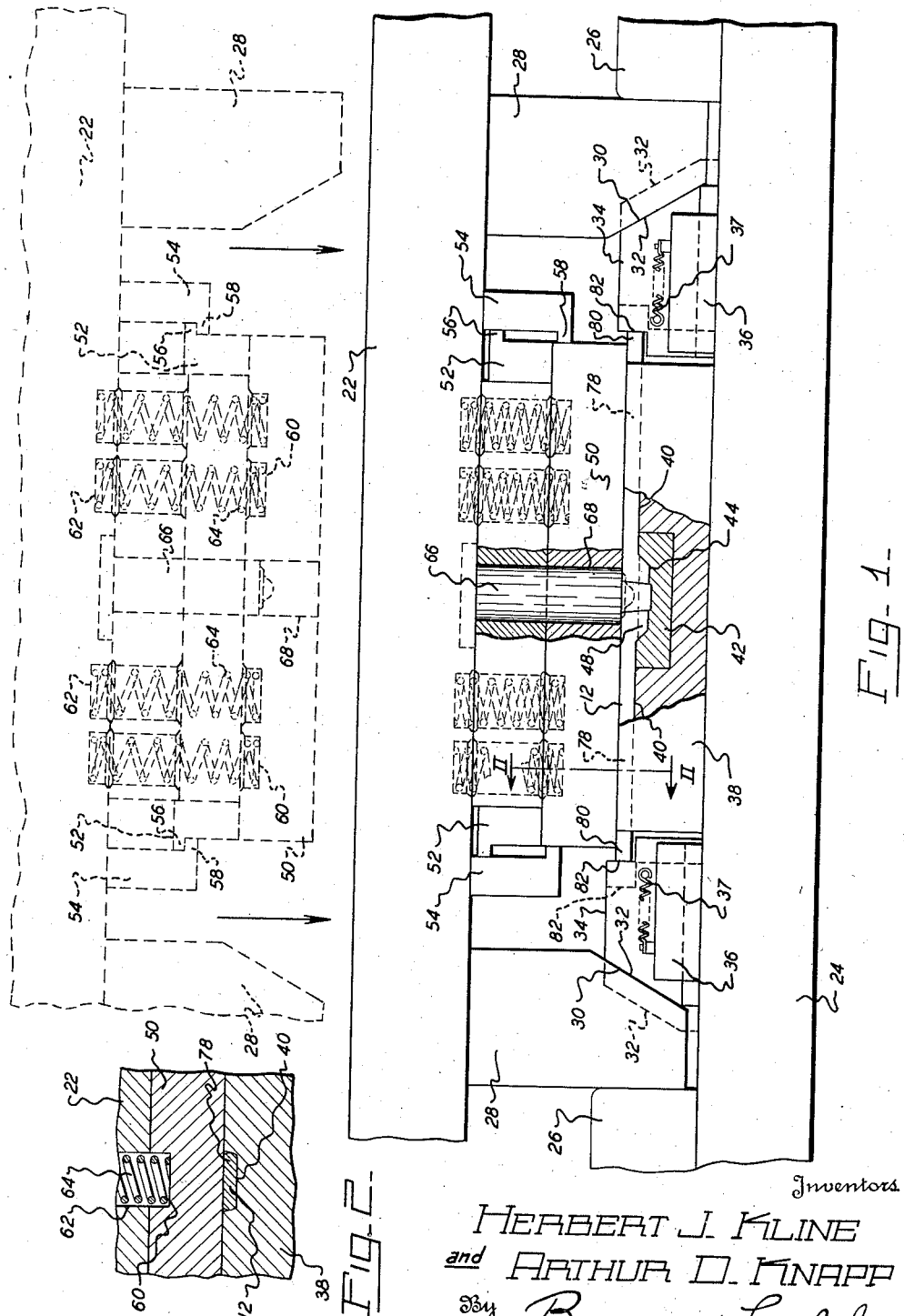

Nov. 18, 1947. H. J. KLINE ET AL 2,430,986
METHOD OF MANUFACTURING TREAD PARTS AND OTHER SIMILAR ARTICLES
Filed Aug. 7, 1942 3 Sheets-Sheet 3
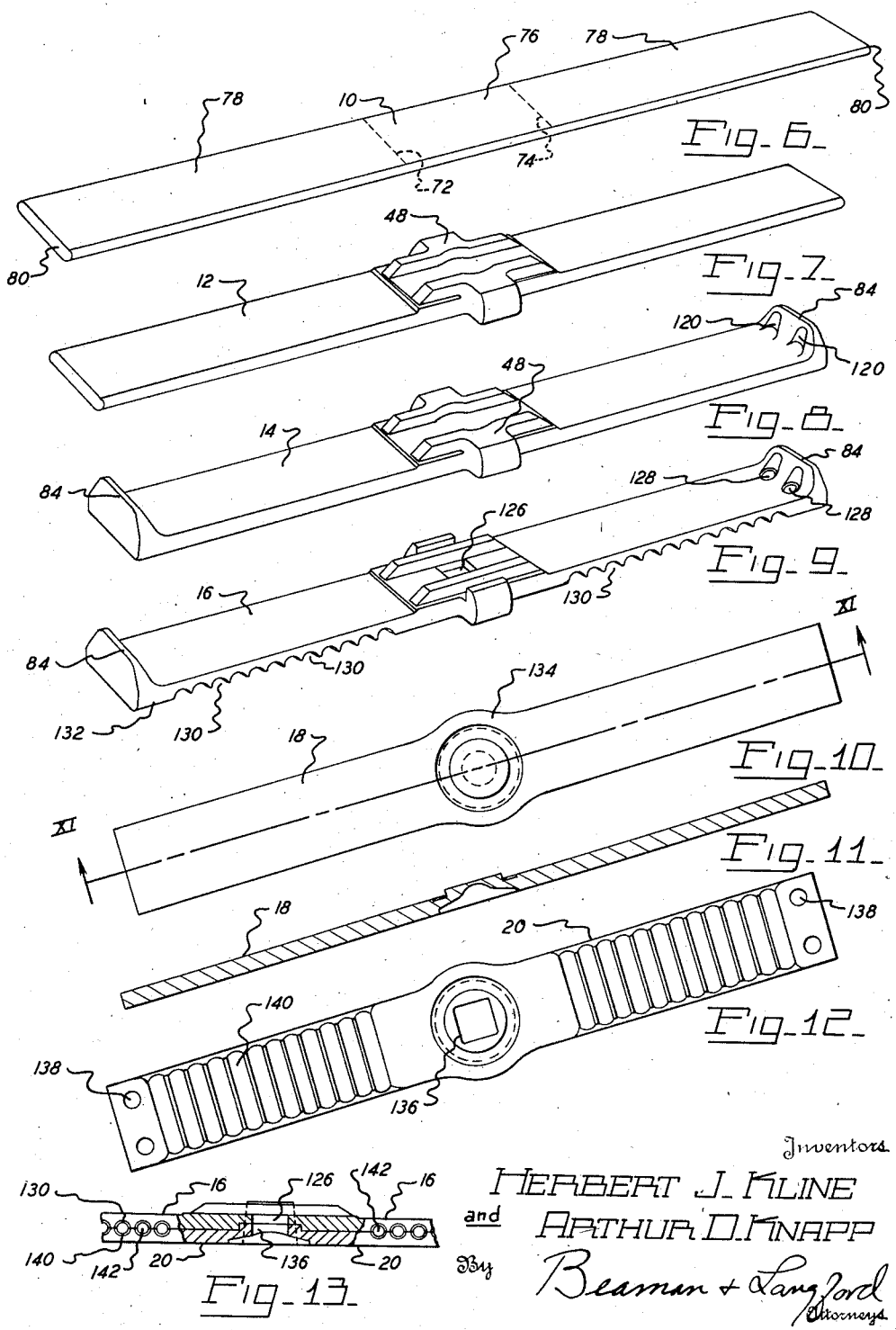

Patented Nov. 18, 1947

2,430,986

UNITED STATES PATENT OFFICE 2,430,986

METHOD OF MANUFACTURING TREAD PARTS AND OTHER SIMILAR ARTICLES

Herbert J. Kline and Arthur D. Knapp, Jackson, Mich., assignors to Mechanical Products, Inc., Jackson, Mich., a corporation of Michigan Application August 7, 1942, Serial No. 454,070

4 Claims. (Cl. 29—148.3)

1

The present invention relates to improvements in method of manufacturing endless tread parts and other similar articles.

At the present time there is insufficient forging equipment in this country to take care of the demand of the national defense program. Thus, it becomes important to develop other practical, economical methods for the manufacture of parts which otherwise would normally be forged. To this end, the present invention provides an improved method of forming and shaping parts of endless tread used upon trucks and tanks and other similar parts capable of being fabricated from steel bars and strips and having intermediate portions thereof of irregular form or increased thickness.

Thus, one of the objects of the present invention is to provide a new and improved method of manufacturing metallic parts of endless treads.

Another object of the invention is to provide an improved method of manufacturing parts from steel bars and strips having upset portions located between the extremities of the parts.

A further object is to provide a method of forming and shaping parts from steel bars and strips to provide finished parts having irregular thickened portions in lieu of forging.

These and other objects and advantages residing in the specific details of my improved method of manufacture, the structure for carrying out the improved method, and the resulting articles of manufacture will more fully appear from the following description and the annexed claims.

Figure 3:
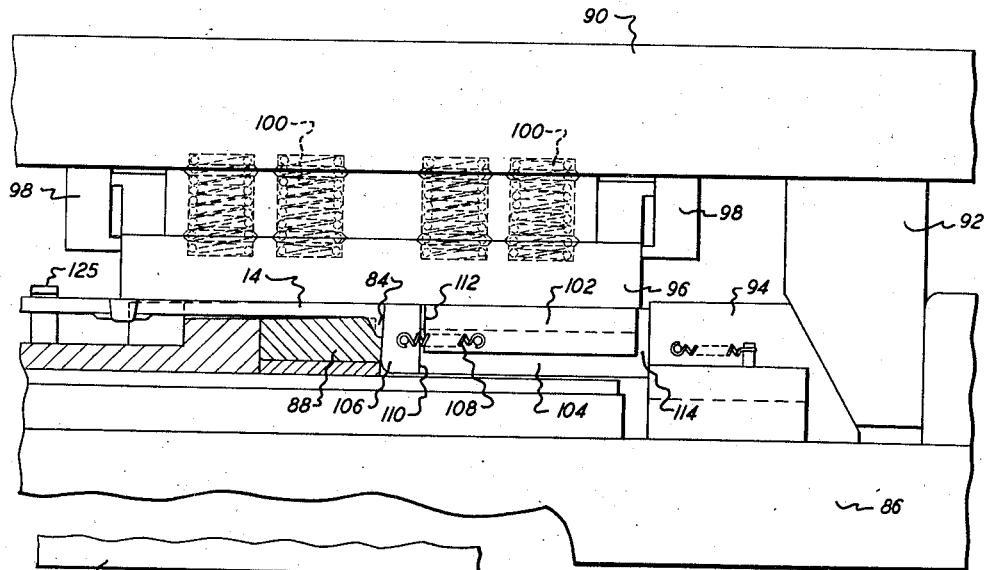
Figure 4:
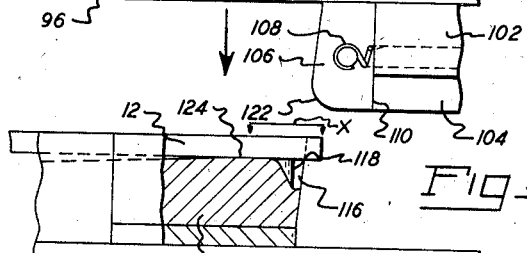
Figure 14:
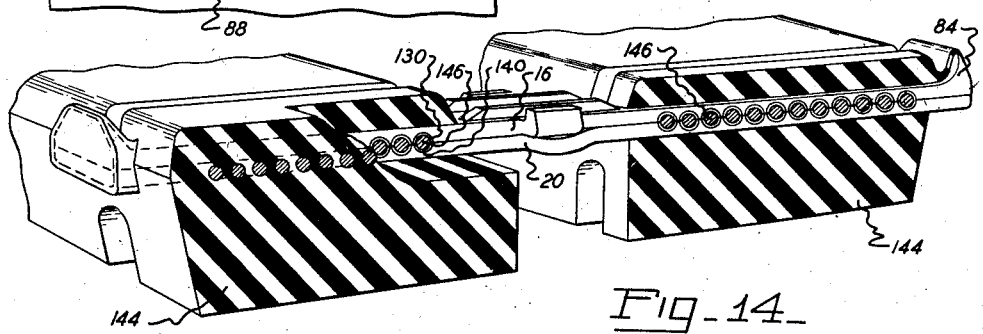
Figure 5:
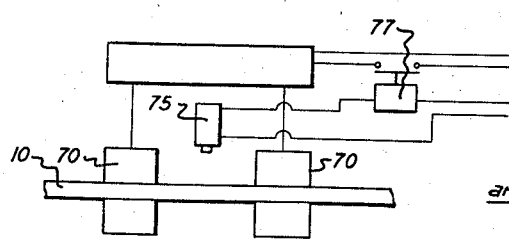

Referring to the drawings, wherein one form of structure is disclosed for carrying out the method of manufacture of the present invention, Fig. 1 is a side elevational view of the forming dies, partially shown in broken vertical cross section, the dotted line representation showing the die in its upper position, Fig. 2 is a cross-sectional view taken on line II—II of Fig. 1, Fig. 3 is a side elevational view, partly shown in broken vertical cross section, of the one end of the die for forming the end of the tread part, Fig. 4 is a side elevational view, partly shown in broken vertical cross section, of the die shown in Fig. 3 in its up position, Fig. 5 is a diagrammatic representation of the electrical heating apparatus for localized heating of the tread parts prior to forming, Fig. 6 illustrates a work blank from which the tread parts are fabricated, Fig. 7 shows the inner tread part after the upsetting operation of its central portion in the dies shown in Figs. 1 and 2, Fig. 8 shows the inner tread part after the end forming operation in the dies shown in Figs. 3 and 4, Fig. 9 shows the inner tread parts following milling and drilling operations, Fig. 10 is a plan view of a work blank corresponding to that of Fig. 6 of slightly less length, following an upsetting operation in dies corresponding to those shown in Figs. 1 and 2, but of different shape and contour, Fig. 11 is a cross-sectional view taken on line XI—XI of Fig. 10, Fig. 12 is a plan view of the outer tread part following machining, Fig. 13 is a fragmentary view showing the upper and lower tread parts assembled, partially shown in broken vertical cross section, and Fig. 14 is a perspective view shown in vertical cross section of a portion of endless tread showing the upper and lower tread parts embedded in rubber.

In Figs. 1 to 4, inclusive, are shown suitable dies for carrying out the method of manufacture on the work blanks shown in Figs. 8 and 10. Preferably, these work blanks are fabricated from a strip of steel as shown in Fig. 6 of uniform cross section cut to the correct length and indicated by reference character 10. For convenience of description, a partly finished inner tread element shown in Fig. 7 is indicated by reference character 12 following the first upsetting operation in the dies of Figs. 1 and 2, by reference character 14 in Fig. 8 following the end forming operation in the dies of Figs. 3 and 4, and by reference character 16 in its finished form in Fig. 9.

The finished outer tread part of Fig. 12 is indicated in Fig. 10 by reference character 18 following the operation in dies corresponding to those of Figs. 1 and 2, and by reference character 20 in its finished form as shown in Fig. 12.

Referring to Figs. 1 and 2, the work blank 12 of Fig. 7 has been formed by the dies which are shown in full line in their closed position. It is to be understood that a work blank corresponding to the blank 10 of Fig. 6 was first inserted into the dies of Figs. 1 and 2 with the same in their open and dotted line positions, and that the blank 12 was formed upon the dies moving into their closed full line position.

The dies of Figs. 1 and 2 comprise an upper die shoe 22, and a lower die shoe 24 having back up blocks 26. Supported in the upper die shoe 12 are cams 28 having angularly disposed cam surfaces 30 which wipe across complementary surfaces 32 of the cam blocks 34. Guides 36 support the cam blocks 34 for horizontal movement toward and away from each other with springs 37 holding the inclined surfaces 30 and 32 in contact with each other when the upper die shoe carrying the cams 28 is raised and lowered.

The lower die 38 has a channel 40 corresponding substantially in depth and width to that of the work blank 10 of Fig. 6. Carried within the lower die 38 is an inserted die form 42 having a cavity 44 corresponding in shape and contour to the central portion 48 of the blank 12 of Fig. 7.

The pressure pad 50 is carried by the upper die shoe 22 through guides 52 and 54. Shoulders 56 and 58 limit the extended downward position of the pressure pad 50 with the upper die shoe in its raised position as shown in dotted outline. Pockets 60 and 62 defined in the pressure pad and the upper die shoe respectively support compression springs 64 in a well-known manner. The punch 66 is supported in the upper die shoe 22 and is projected during operation of the press through the bore 68 defined in the pressure pad 50. As more clearly shown in Fig. 2, when the upper die shoe 22 has been lowered during the operation of the press, the pressure pad 50 is supported upon the lower die 38, bridging the channel 40 to completely support the work blank in all directions against bodily movement except in an axial direction.

In Fig. 5, the work blank 10 of Fig. 6 is shown clamped between electrodes 70 of a resistance heating unit to heat the central portion between the lines 72 and 74 (see Fig. 6) to a relatively high temperature. In practice, this temperature may run up to 2200° F. and as shown in Fig. 5 the heating is controlled through a photoelectric cell 75 operating a circuit opening relay 77, all of well-known construction. In practice, the heating of the central portion 76 of the blank 10 is so rapid that the ends 78 remain substantially at room temperature and are cool enough to permit bare hand handling for transferring the work blank 10 from the resistance heater to insert it in the groove 40 of the lower die 38 in position so that the extremities 80 of the work blank 10 are engaged by the shoulders 82 of the cam blocks 34. Movement of the upper die shoe from the dotted line position shown in Fig. 1 toward the full line position first results in the pressure pad 50 engaging with the lower die 38, building up sufficient pressure to confine the work blank 10 against movement in any direction in the groove 40 except axially. As the cams 28 engage with the cam blocks 34, the latter move inwardly toward each other, bringing the shoulders 82 against the extremities 80 of the blank 10. As the upper die shoe 28 continues downwardly, the inward movement of the cam blocks 34 is transmitted to the end portions 78 of the work blank, upsetting the heated central portion 76 into the cavity 44 of the inserted die form 42. Preferably, the movement of the upper die shoe 22 is so regulated that its final movement downwardly fully advances the punch 66 and sufficiently advances the cam block 34 to complete the upset of the central portion 48 and fill the cavity 44. In practice, the advance of the cam block 34 is regulated to provide a slight flash of metal between the dies defining the cavity 44. This will take care of slight variations in the length of the work blanks 10. By keeping the dies defining the cavity 44 in good condition and the length of the work blanks 10 to close limits, it is possible to upset the central portion 48 substantially to finished dimensions and without appreciable flash.

The work piece 12 of Fig. 7 is formed in the manner just described by the forming dies of Figs. 1 and 2. To produce the work piece 14 of Fig. 8, the piece 12 is placed on the forming dies of Figs. 3 and 4 to turn up and form the ends 84. In Fig. 3 the forming dies are shown closed while in Fig. 4 the work piece 12 is shown in position prior to closing the dies forming the ends 84. The lower die shoe 86 carries the lower die 88 which is channeled in the manner of the die 38 of Fig. 2. An upper die shoe 90 is movable and carries a cam 92 which actuates the cam block 94. Also supported from the shoe 90 is a pressure pad 96 supported for vertical movement in guides 98 upon compression and expansion of the springs 100. Fixed to the under side of the pressure pad 96 are spaced ram guides 102 which support the ram 104 for horizontal movement. At the outer end of the ram 104 is a replaceable forming nose 106. Springs 108 retract the ram 104 to bring the shoulder 110 against the stop 112 of the guides 102 as shown in Fig. 4. Referring to Fig. 3, the end 114 of the ram 104 is acted upon by the cam block 94 to impart the necessary horizontal movement to the ram 104. As shown in Fig. 4, the die 88 is provided with a recess 116 having spaced protuberances 118 for the forming of the recesses 120 of Fig. 8.

To form the ends 84 of the work piece 14, the ends of the work piece 12 are preferably heated over the distance as indicated at X in Fig. 4. With the work piece 12 positioned as shown in Fig. 4, the portion 122 of the ram nose 106 bends the end which overhangs the recess 116 downwardly. As the shoe 90 continues its downward movement it brings the pressure pad 96 into a position confining the work piece 12 in the channel 124. The final movement of the shoe 90 imparts a slight amount of horizontal movement to the ram nose bringing the ram nose 106 into the position shown in Fig. 3 to complete the forming of the ends 84 of Fig. 8. A finger 125 holds the work piece in position at the time the nose 106 bends the end downwardly.

In Fig. 9, the work piece 14 of Fig. 8 is shown finished as the inner tread part 16. The central portion 48 has been pierced at 126, milled to the contour shown, drilled at 128, and the cross grooves 130 milled along the inner face 132.

The outer tread part 18 of Figs. 10 and 11 is formed by upsetting the central portion 134 from a work blank 10 of Fig. 6. Preferably, the upsetting and forming of the central portion 134 is carried out in the forming die of Figs. 1 and 2 with the appropriate shaped die 42 and punch 66. In Fig. 12, the part 18 of Figs. 10 and 11 is shown as the finished outer tread part 20, the hole 136 having been pierced, the holes 138 drilled and the cross grooves 140 milled.

Referring to Fig. 13, the inner and outer tread parts 16 and 20 are shown assembled upon each other, with the grooves 130 and 140 collectively defining passages 142. In Fig. 14, the tread parts are shown embedded in the continuous rubber tread 144 with the cables 146 passing through the passage defined by the cross grooves 130 and 140.

Having thus described our invention, what we desire to protect by Letters Patent and claim is:

1. A manufacturing method of simulating a forged metal part having intermediate portions of increased cross-sectional dimensions from a metal blank of uniform cross-section, comprising the steps of cutting the blank to a length greater than the desired length of the finished part, heating certain portions of said blank to relatively high temperature while maintaining other portions thereof at relatively low temperature, confining the portions maintained at relatively low temperature against movement in all directions except axial, embracing portions of said blank having relatively high temperature in a cavity having clearance with the blank in a radial direction, upsetting said heated portions into said cavity through axial movement of said lower temperature blank portions through pressure applied inwardly axially thereof to form an enlarged and thickened portion, piercing said enlarged portion, and machining the thick and thin portions of said blank to the desired finished shape of the metal part.

2. A manufacturing method of simulating a forged metal part having intermediate portions of increased cross-sectional dimensions from a metal blank of uniform cross-section, comprising the steps of cutting the blank to a length greater than the desired length of the finished part, heating middle portions of said blank to relatively high temperature while maintaining end portions thereof at relatively low temperature, confining the end portions against movement in all directions except axial, embracing the middle heated portions of said blank in a cavity having clearance with the blank in a radial direction and having the cavity provided with enlarged clearance portions corresponding substantially to the general form of enlarged ribs desired on the finished blank, upsetting said heated portions into said cavity through axial endwise pressure exerted inwardly upon the ends of said blank of lower temperature, thereby enlarging the blank in ribs extending lengthwise thereof by thickening the material through its lesser dimension, and thereafter machining the thick and thin portions of said blank to the desired finished shape of the metal part.

3. A manufacturing method of simulating a forged metal part having intermediate portions of increased cross-sectional dimensions from an elongated flat metal blank of substantially uniform cross-section throughout its length, comprising the steps of cutting the blank to a length greater than the desired length of the finished part, heating middle portions of said blank to relatively high temperature, maintaining other portions thereof toward the ends at relatively low temperatures, confining the portions maintained at relatively low temperature against movement in all directions except axial, embracing the heated portion of said blank in a cavity having lateral clearance corresponding substantially to the desired finished shape of the part, upsetting said heated portion into said cavity through axial inward endwise pressure applied to the lower temperature blank portions thereby enlarging said blank transversely of its greater dimension, piercing said enlarged portion, and machining the blank to the desired finished shape of the metal part.

4. A manufacturing method of simulating a forged metal part having intermediate portions of increased cross-sectional dimensions from an elongated metal blank having substantially uniform cross-section, comprising the steps of cutting the blank to length greater than the desired length of the finished part, heating middle portions of said blank to relatively high temperature while maintaining end portions thereof at relatively low temperature, confining the portions maintained at relatively low temperature against movement in all directions except axial, embracing heated portions of said blank in a cavity having clearance with the blank in a radial direction, with the cavity corresponding substantially to the shape of enlargements desired in the finished part, upsetting said heated portions into said cavity through pressure applied axially inwardly upon the portions maintained at relatively low temperature, thereby forming an enlarged and thickened portion, upsetting and shaping the ends of the blank, piercing desired portions of said blank, and machining the thick and thin and shaped portions of said blank to the desired finished shape and dimensions of the metal part.

HERBERT J. KLINE.
ARTHUR D. KNAPP.

REFERENCES CITED

The following references are of record in the file of this patent:

UNITED STATES PATENTS

| Number | Name | Date |
|---|---|---|
| 1,668,442 | Wineman | May 1, 1928 |
| 2,314,574 | Dickerman | Mar. 23, 1943 |
| 2,066,186 | Mitchell | Dec. 29, 1936 |
| 2,272,425 | Nettenstrom | Feb. 10, 1942 |
| 1,952,545 | Gotshall | Mar. 27, 1934 |
| 2,037,415 | Heaslet | Apr. 14, 1936 |
| 2,039,012 | Lindberg | Apr. 28, 1936 |
| 2,067,269 | Johnson | Jan. 12, 1937 |
| 2,025,999 | Myers | Dec. 31, 1935 |
| 1,397,314 | Cox | Nov. 15, 1921 |
| 1,632,674 | Pearson | June 14, 1927 |
| 1,517,716 | Dutkiewicz | Dec. 2, 1924 |